United States Patent
Metzler (10) Patent No.: US 9,671,217 B2
(45) Date of Patent: Jun. 6, 2017

(54) STRUCTURE MEASURING UNIT FOR TRACKING, MEASURING AND MARKING EDGES AND CORNERS OF ADJACENT SURFACES

(75) Inventor: Bernhard Metzler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 135 days.

(21) Appl. No.: 14/113,800

(22) PCT Filed: Jun. 28, 2012

(86) PCT No.: PCT/EP2012/062647
§ 371 (c)(1),
(2), (4) Date: Oct. 24, 2013

(87) PCT Pub. No.: WO2013/004602
PCT Pub. Date: Jan. 10, 2013

(65) Prior Publication Data
US 2014/0104419 A1    Apr. 17, 2014

(30) Foreign Application Priority Data
Jul. 1, 2011  (EP) .................................. 11172439

(51) Int. Cl.
*H04N 7/18* (2006.01)
*G01B 11/00* (2006.01)
(Continued)

(52) U.S. Cl.
CPC ............ *G01B 11/00* (2013.01); *G01C 15/002* (2013.01); *G01S 17/89* (2013.01); *G06T 7/13* (2017.01);
(Continued)

(58) Field of Classification Search
CPC .................. G01B 11/00; G06T 7/0085; G06T 2207/20164; G06T 2207/20136; G01S 17/89; G01C 15/002
(Continued)

(56) References Cited

U.S. PATENT DOCUMENTS 7,982,866 B2   7/2011  Vogel
7,990,550 B2   8/2011  Aebischer et al.
(Continued)

FOREIGN PATENT DOCUMENTS

CN   101142496 A    3/2008
DE   44 43 413 A1   6/1996
(Continued)

OTHER PUBLICATIONS

European Search Report dated Dec. 1, 2011 as received in Application No. EP 11 17 2439.
(Continued)

*Primary Examiner* — Richard Torrente
(74) *Attorney, Agent, or Firm* — Maschoff Brennan (57) ABSTRACT

A measuring unit having an edge tracking function which runs at least partially automatically. After an at least coarse alignment of a targeting unit having an alignment display function at a first corner known or defined by a user between adjacent surfaces of the structure and a recording of an image of the said first corner with the environment thereof, edge lines are identified as part of the edge tracking function by means of an edge definition by image processing, a query is made as to which of the identified edges lines should be tracked starting from the first corner or in which direction the identified edge line should be tracked starting from the first edge point a user-defined edge line is tracked automatically by the targeting unit at least as far as to a further corner, (Continued)

wherein spatial points situated along the user-defined edge line are measured if necessary.

19 Claims, 6 Drawing Sheets

(51) Int. Cl.
  *G01C 15/00* (2006.01)
  *G01S 17/89* (2006.01)
  *G06T 7/13* (2017.01)
  *G06T 7/181* (2017.01)

(52) U.S. Cl.
  CPC .... *G06T 7/181* (2017.01); *G06T 2207/20164* (2013.01)

(58) Field of Classification Search
  USPC .......................................................... 348/140
  See application file for complete search history.

(56) References Cited

U.S. PATENT DOCUMENTS

| | | | |
|---|---|---|---|
| 2006/0023204 A1 | 2/2006 | Filep | |
| 2009/0220054 A1* | 9/2009 | Baumann | H01J 35/00 378/205 |
| 2010/0000104 A1* | 1/2010 | Mollmer | G01C 9/10 33/365 |
| 2010/0030515 A1* | 2/2010 | Kludas | G01C 15/002 702/159 |
| 2011/0219633 A1* | 9/2011 | Hanna | G01B 11/27 33/286 |
| 2012/0130675 A1* | 5/2012 | Schorr | G01C 15/105 702/154 |

FOREIGN PATENT DOCUMENTS

| | | |
|---|---|---|
| DE | 195 45 589 A1 | 6/1997 |
| DE | 196 48 626 A1 | 5/1998 |
| EP | 1 574 821 A2 | 9/2005 |
| EP | 2 053 353 A1 | 4/2009 |
| JP | 2007-514943 A | 6/2007 |
| WO | 96/18083 A | 6/1996 |
| WO | 2005/090910 A1 | 9/2005 |
| WO | 2008/089792 A1 | 7/2008 |

OTHER PUBLICATIONS

Mortensen et al., "Adaptive boundary detection using "live-wire" two-dimensional dynamic programming", Proceedings of Computers in Cardiology, 1992, pp. 635-638.

* cited by examiner

STRUCTURE MEASURING UNIT FOR TRACKING, MEASURING AND MARKING EDGES AND CORNERS OF ADJACENT SURFACES

FIELD OF THE INVENTION

The invention relates to a structure measuring unit for measuring and marking spatial points along edges and/or corners between adjacent surfaces of a structure within the scope of building and/or extending—in particular extending the interior of—buildings and to an associated method for tracking and measuring or marking spatial points along edges and/or corners between adjacent surfaces of a structure by means of the structure measuring unit and to a computer program product for providing, controlling and carrying out an edge-tracking and projection functionality for such a unit.

BACKGROUND

In respect of objects for measuring structures, an essential aspect is that significant spatial points to be measured are often connected to one another by edges. By way of example, an edge which separates a wall of a room from the ceiling connects two corners of the room. By way of example, if all four corners of the ceiling of a room with a rectangular outline are to be measured, the sighting direction of a structure measuring unit can be changed from a first corner to a next corner by virtue of an edge extending between these corners being tracked.

In the case of simple conventional structure measuring units, a spatial point, e.g. a corner, is sighted manually and the sighting direction is then changed manually to a next spatial point to be measured, e.g. a further corner.

DE 196 48 626 for example discloses a method and a device for measuring an area using a laser ranger with a laser transmitter and a laser receiver. The laser ranger is mounted on a stand. The device furthermore comprises a tilt and rotation apparatus for alignment and direction measuring purposes, a scope and an electronic evaluation unit for detecting angular data and distance data and for transmitting data to a computer. For the purposes of measuring a room, the unit is positioned at a central location in the room, from which all spatial and/or area corners to be detected can be targeted and impinged upon by the laser beam. In accordance with the disclosure of DE 196 48 626, the spatial points to be measured are in this case each targeted individually, optionally with support by observation through a scope in the case of a relatively large distance. Automated sequential measuring of several spatial points, for example for comparison with a scan, is not disclosed in DE 196 48 626. In particular, this document provides no hints whatsoever for options for automatic tracking of edges between adjacent corners to be measured.

A similar device and associated measuring method are disclosed in DE 44 43 413, the complementary laid-open application DE 195 45 589 and in WO 96/18083, which claims the priority of DE 44 43 413. There, a method and a device are described for measuring and marking on distanced lines, areas or in at least partly closed rooms. One or more relevant spatial points are measured in respect of in each case two spatial angles and the distance in relation to a reference point using a laser-distance measuring unit, mounted in a cardan-type mount. The laser-distance measuring unit is pivotable about two mutually perpendicular axes which are equipped with goniometers. In accordance with one embodiment described in these documents, spatial points to be measured are targeted manually, marking points are calculated from the measurement data based on a predetermined relative relationship between measuring and marking, which marking points are then targeted independently by the measuring and marking device.

However, an automatically running functionality for tracking edges, proceeding from merely one defined first spatial point, is not disclosed, and nor is an automated sequential measurement of several spatial points, for example for comparison with a scan.

EP 1 733 185 discloses a device and a method, by means of which, specifically, edges on a polygonal but otherwise planar surface are to be measured exactly. However, an automatically running functionality for tracking edges, proceeding from merely one defined first spatial point, is not disclosed, and nor is an automated sequential measurement of several spatial points.

EP 2 053 353 discloses a reference line-projecting unit with an electro-optical distance measuring unit. In accordance with the teaching of this application document, an optical reference beam, in particular a laser beam, is routed along a defined reference path. In the context of passing along the reference path, there is a distance measurement to at least one point of the reference path by emitting a measurement beam parallel or coaxial to the reference beam or by using the reference beam as measurement beam. After receiving components of the returned measurement beam, a signal is derived from these components and a distance to the at least one point is determined from the signal, wherein the routing along the reference path is repeated at least once and a distance or a distance-related variable is established in each case on each passing through the reference path for the at least one point. Hence, in the case of angle-synchronous distance measurements, the same points are scanned multiple times.

By integrating a distance measuring unit, the system disclosed in EP 2 053 353 also enables a control of the projection on the basis of an established surface topography. In particular, what is disclosed is that, after determining a surface profile, a projection onto a curved surface can be adapted in such a way that distortions due to the curved surface are compensated for and the projection corresponds to the undistorted contour of an object to be measured out or to be marked.

However, nor does EP 2 053 353 disclose or suggest a functionality for, in particular automatic, tracking of edges proceeding from merely one defined, first spatial point.

SUMMARY

An object of the invention lies in the provision of a structure measuring unit for measuring and marking significant spatial points, in particular for tracking edges and measuring the corners thereof, having improved operating convenience and a correspondingly increased possible measuring or marking speed.

These objects are achieved by the implementation of the characterizing features of the independent claims. Features which develop the invention in an alternative or advantageous manner can be gathered from the dependent patent claims and the description including the description of the figures.

The subject matter of the invention relates to a structure measuring unit for tracking and measuring or marking spatial points along edges and/or corners between adjacent surfaces of a structure within the scope of building and/or extending—in particular extending the interior of—buildings. The unit comprises a base and a top part, mounted on the base such that it is rotatable about a rotational axis within an angular range of an azimuth or horizontal angle. Arranged on the top part is a sighting unit which is mounted such that it is pivotable about a pivot axis within an angular range of an elevation or vertical angle and equipped with a laser source designed to emit a laser beam, and a distance-determination detector for providing a distance-measuring functionality. The sighting unit moreover comprises an imaging detector, in particular a camera, and an alignment-display functionality for specifying an alignment of the sighting unit on a spatial point as sighting point.

The structure measuring unit according to the invention furthermore comprises an evaluation and control unit with a display, on which the alignment of the sighting unit can be displayed by means of the alignment-display functionality, which can be superposed onto an image of a currently sighted spatial point.

The unit comprises a first and a second rotational drive, which render it possible to drive the top part or the sighting unit or make it possible to align said component(s) at an azimuth angle and an elevation angle. A spatial alignment of the sighting unit in relation to the base can be detected by two goniometers for determining the horizontal and vertical alignment, i.e. the azimuth angle and the elevation angle. The evaluation and control unit is connected to the laser source, the distance-determination detector and the goniometers in order to associate a detected distance with a corresponding alignment (i.e. azimuth and elevation angles captured in the process) and hence determine coordinates for spatial points. Moreover, the evaluation and control unit is connected to the imaging detector.

The unit can additionally be equipped with two tilt sensors, preferably with two bubble sensors, the measurement data of which are then likewise transmitted to the evaluation and control unit. Hence, it is additionally possible to determine the alignment of the sighting unit in relation to the Earth's gravitational field vector.

According to the invention, the structure measuring unit has edge-tracking and projection functionality, which runs at least partly automatically after triggering, for tracking and measuring or marking edges and/or corners, and optionally spatial points situated along an edge, between adjacent surfaces in any form of the structure.

Within the scope of this functionality, after aligning the sighting apparatus with the alignment-display functionality to a known or user-defined first corner between adjacent surfaces of the structure and recording an image of this first corner with the surroundings thereof, edge lines are determined by determining edges by image processing, and a user-defined edge line is automatically tracked by the sighting unit, at least until a further corner, wherein, optionally, spatial points situated along the user-defined edge line are measured.

The edge-tracking and projection functionality is preferably designed to display to a user on a display of the evaluation and control unit suggestions, to the user, for tracking edge lines by symbols and, after selecting and confirming a suggestion represented by a symbol, to automatically track a selected edge line by the sighting unit, at least until a further corner, wherein, optionally, spatial points situated along the user-defined edge line are measured.

According to the invention, within the scope of tracking a selected edge line by an appropriate change in the alignment of the sighting unit in the horizontal and/or elevation direction, there can be continuous and/or periodic recording of images and determining of an edge line belonging to an edge by means of edge extraction using digital image processing, wherein a deviation of the alignment-display functionality from the edge line belonging to the selected edge is determined in the image, from which a corresponding correction of the alignment of the sighting unit is determined and, on the basis of this, the sighting unit is aligned to the selected edge line.

In accordance with one possible embodiment of the invention, it is possible, after tracking an edge line from the first corner to a first further corner, to halt the edge-tracking and projection functionality, to measure the first further corner in a user-defined manner, and/or to continue the edge-tracking and projection functionality to a further corner.

Suggestions for tracking edge lines can be displayed to the user on a display of the evaluation and control unit by means of symbols and an edge line to be tracked can be selected or a suggestion can be confirmed by clicking on or touching the associated symbol on a touchscreen.

Suggestions for tracking edge lines can also be displayed to the user on a display of the evaluation and control unit by means of alphanumeric characters, and an edge line to be tracked can be selected or a suggestion can be confirmed by entering a corresponding alphanumeric character on a keyboard of the evaluation and control unit.

An edge to be tracked can also be selected by marking a line on a display of the evaluation and control unit, for example by means of a pen on a touchscreen.

It is characterizing for a special embodiment of the structure measuring unit according to the invention that the edge-tracking and projection functionality is equipped for providing an option for automatic tracking and measuring of edge lines along a continuous path between a plurality of neighboring corners, wherein the edge lines enclose a common surface of the structure.

The edge-tracking and projection functionality can be designed for tracking edge lines, which are arranged at right angles to one another.

The edge-tracking and projection functionality can also be designed for tracking edge lines which are arranged at an angle to one another which deviates from 90°.

Furthermore, the edge-tracking and projection functionality can be designed for tracking curved edge lines.

Further subject matter of the invention relates to a computer program product with program code, which is stored on a machine-readable medium, for providing, controlling, and carrying out the edge-tracking and projection functionality of the structure measuring unit according to the invention according to one of the aforementioned embodiments. The program is preferably executed on an electronic data processing unit embodied as evaluation and control unit of the structure measuring unit according to the invention.

Further subject matter of the invention relates to a method for tracking and measuring or marking spatial points along edges and/or corners between adjacent surfaces of a structure within the scope of building and/or extending—in particular extending the interior of—buildings by means of a structure measuring unit according to the invention according to one of the aforementioned embodiments. Following the method according to the invention, the sighting unit is initially aligned to a known or user-defined first corner between adjacent surfaces of the structure or of the room. This first corner is measured, the spatial coordinates thereof are stored and an image of this first corner with the surroundings thereof is recorded. Within the scope of the edge-tracking and projection functionality, edges are determined by means of image processing and edge lines originating from this first corner are determined. A user-defined edge line is then tracked automatically to a further corner, where, optionally, spatial points situated along this edge line are measured.

Further embodiments of the method according to the invention can be gathered from the dependent claims.

BRIEF DESCRIPTION OF THE DRAWINGS

The structure measuring unit according to the invention and the method according to the invention are described in more detail below in a purely exemplary manner on the basis of specific exemplary embodiments depicted schematically in the drawings, wherein further advantages of the invention are also explained in detail.

In detail:

FIGS. 2a to 3b show the basic functioning of the edge-tracking and projection functionality of the structure measuring unit according to the invention and of the associated measuring method according to the invention;

DETAILED DESCRIPTION

Figure 1A:
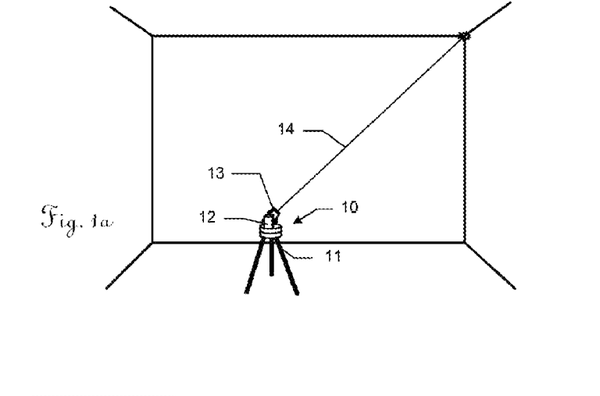
FIGS. 1a and 1b show a structure measuring unit according to the invention for tracking and measuring or marking spatial points of surfaces of a structure, in particular internal rooms of buildings.
Figure 1B:
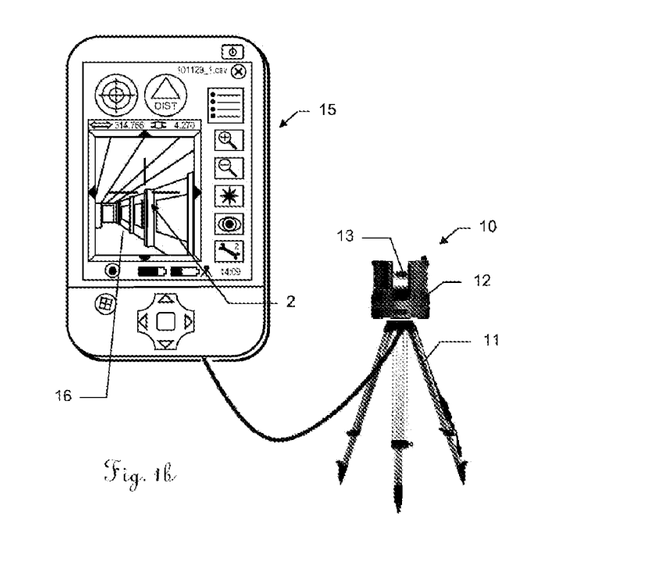

FIGS. 1a and 1b show a structure measuring unit 10 according to the invention for tracking and measuring or marking spatial points of surfaces of a structure, in particular of interior rooms of buildings. The structure measuring unit 10 comprises a base 11, which is embodied as a three-legged stand in this example, with a top part 12 rotatably mounted thereon. A sighting unit 13, mounted on the top part 12 in a pivotable manner, is equipped with a laser source designed to emit a laser beam 14 and with a laser-light detector as distance-determination detector and therefore provides a distance-measuring functionality. The sighting unit 13 moreover comprises an imaging detector, in particular a camera.

The structure measuring unit 10 moreover comprises an evaluation and control unit 15, as depicted in FIG. 1b, wherein a first and a second rotational drive (not depicted) render it possible to drive the top part 12 or the sighting unit 13 or align said component(s) at an azimuth angle and an elevation angle. The spatial alignment of the sighting unit 13 in relation to the base 11 can be detected by two goniometers. Additionally, tilt sensors can be provided for determining the alignment in relation to the Earth's gravitational field vector.

The evaluation and control unit 15 comprises a display 16 with an alignment-display functionality 2.

The evaluation and control unit 15 is connected to the laser source, the laser-light detector and the goniometers and, optionally, to the tilt sensors in order to associate a detected distance and detected azimuth angle and elevation angle with a corresponding alignment of the sighting unit 13 and hence determine coordinates for spatial points. Moreover, the evaluation and control unit 15 is connected to the imaging detector.

According to the invention, the structure measuring unit 10 has an edge-tracking and projection functionality, which runs at least partly automatically after triggering, for tracking and measuring or marking edges and/or corners and optionally spatial points situated along an edge between adjacent surfaces of any form of the structure. This functionality is illustrated on the basis of the subsequent figures.

Figure 2A:
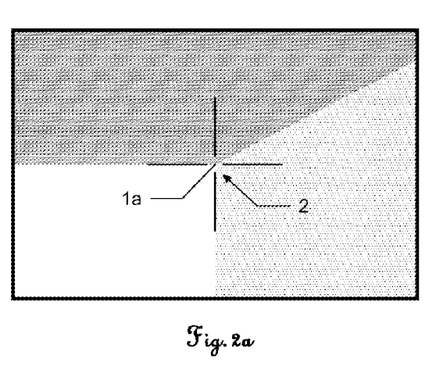

FIG. 2a schematically shows an image on the display of the evaluation and control unit 15 for a situation in which a user targets a first corner 1a, for example on the ceiling of a room, with the sighting unit 13. The alignment of the sighting unit 13 to the corner 1a is indicated in the display 16 with crosshairs as alignment-display functionality 2, wherein the center of the crosshairs corresponds to the sighted corner 1a.

Figure 2B:
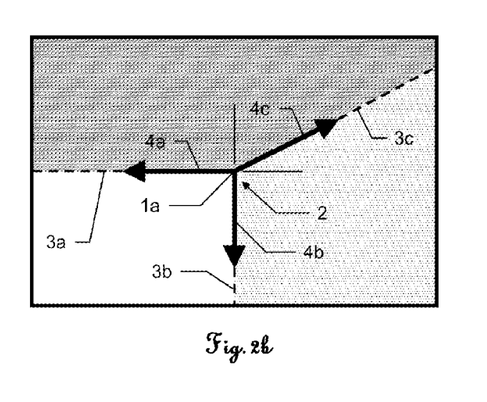

As depicted in FIG. 2b, an image of the corner 1a and the surroundings thereof is recorded after triggering the edge-tracking and projection functionality. All edge lines 3a, 3b and 3c originating from the corner 1a are determined on the basis of image processing. The direction of the identified edge lines 3a, 3b, 3c can, for example, be displayed to the user by means of directional arrows 4a, 4b, 4c as symbols.

Figure 3A:
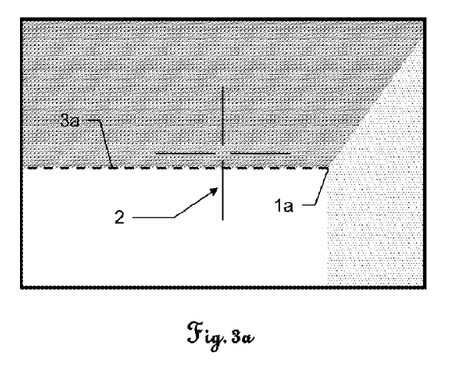

By selecting a symbol, for example 4a, for tracking the edge 3a and by entering a corresponding command into the evaluation and control unit 15, for example by clicking onto the symbol 4a using the mouse, touching this symbol on a touchscreen or by entering it using a keyboard, the evaluation and control unit 15 is prompted to change the alignment of the sighting unit 13, so as to follow the edge line 3a, by actuating the motor drives with said sighting unit. This is illustrated in FIG. 3a. In the process, images are recorded continuously, in which the tracked edge line 3a is determined by means of image processing and a deviation of the current sighting direction of the sighting unit 13, displayed by the center of the crosshairs as alignment-display functionality 2, from the edge line 3a is determined. Such deviations are converted into angle corrections for aligning the sighting unit 13 and the alignment thereof is automatically corrected accordingly.

Figure 3B:
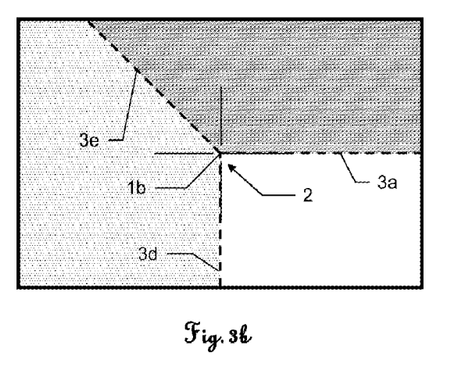

As depicted in FIG. 3b, the edge line 3a continues to be automatically tracked until a crossing point of two or more edge lines 3a, 3d, 3e, corresponding to a second corner 1b, is established. In accordance with one possible embodiment of the invention, the automatic edge-tracking and projection functionality is then halted and the user is requested to prompt a measurement of this second corner 1b or a continuation of the edge-tracking and projection functionality along a further edge line up to a further corner. In the latter case, the method steps of the edge-tracking and projection functionality are repeated in accordance with the illustrations in FIGS. 2b, 3a and 3b and the associated preceding description.

Figure 4A:
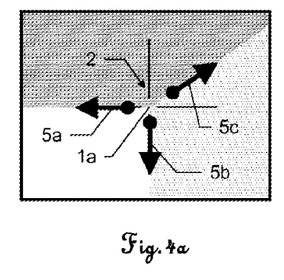
FIGS. 4a to 4c show various variants of the edge-tracking and projection functionality with different input options for a user for triggering the tracking of an edge line.
Figure 4B:
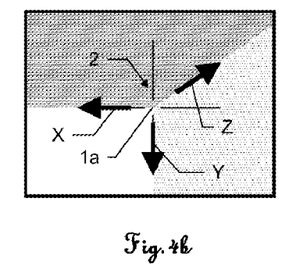
Figure 4C:
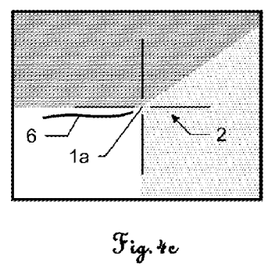

Without loss of generality, FIGS. 4a to 4c depict different variants of the edge-tracking and projection functionality with different input options for a user to prompt tracking of an edge line, wherein the alignment of the sighting unit 13 in relation to a first corner 1a is specified in each case in the detector image on the display 16 by means of the alignment-display functionality 2.

FIG. 4a depicts arrows 5a, 5b, 5c which are depicted on a display 16 embodied as a touchscreen and the touching of which on the display 16, for example by means of a pen, triggers a displacement of the sighting unit 13 along the indicated direction.

FIG. 4b illustrates the display of alphanumeric characters X, Y, Z for different proposed displacement directions along various edge lines on the display 16, the entry of which by means of a keyboard prompts a corresponding displacement of the sighting unit.

FIG. 4c depicts a further option for prompting the tracking of an edge line by virtue of the user marking a line 6 on a display 16 of the evaluation and control unit 15 by virtue of, for example by means of a pen on a touchscreen, coarsely drawing one of the leaving edges, starting from close to the corner 1a.

Referring back to FIGS. 2b and 3b, a special embodiment of the structure measuring unit according to the invention is explained, according to which the edge-tracking and projection functionality is equipped for providing an option for automated tracking and measuring of edge lines along a continuous path between a plurality of neighboring corners, wherein the edge lines enclose a common surface of the structure.

The starting point for this option is that it is well-known that it is possible to assign appropriate corners to a surface enclosed by edge lines and that it is possible to exclude edge lines pointing away from this surface. By way of example, the current problem can lie in determining the four corners of the ceiling in a rectangular room.

With reference to FIG. 2b, a user can, after selecting and measuring a first corner 1a and automatic determination of the edge lines 3a, 3b, 3c originating from there, exclude the edge line 3b leading away from the ceiling such that all that remain as alternatives are edge lines 3a, 3c that can potentially be tracked. By way of example, the edge line 3a is selected because it has the smallest tilt to the image horizontal in the two-dimensional image depiction and therefore with high probability constitutes a boundary line of a horizontal plane such as a room ceiling. In accordance with this option of the special embodiment of the invention, the alignment of the sighting unit 13 is changed, following edge line 3a, until the next corner 1b, as depicted in FIG. 3b, is reached. In accordance with this functionality option, the edge line 3a is excluded as an edge line to be tracked further because it has already been tracked; the edge line 3d, which leads away from the ceiling, is likewise excluded from tracking and the edge line tracking and measuring of the spatial points and corners are continued automatically, following edge line 3e.

Figure 5A:
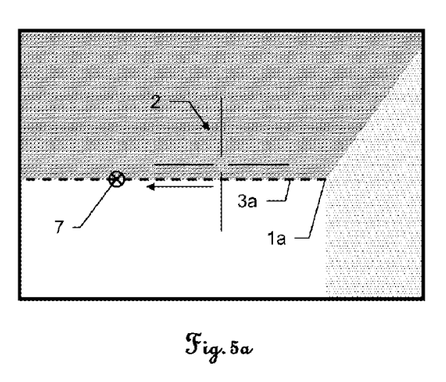
FIGS. 5a and 5b show further details in respect of the functionality of the edge tracking for the purposes of explaining the procedure for sequential corner determination, after a user has selected an edge line to be tracked, which originates from a first corner.
Figure 5B:
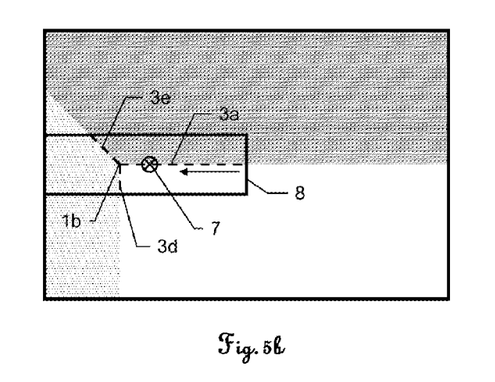

FIGS. 5a and 5b depict the functionalities of edge tracking and edge determination and of establishing corners in more detail.

Here, FIG. 5a serves to explain the functionality of edge tracking for the procedure for determining corners in sequence after a user has selected an edge line 3a which originates from a corner 1a and is to be tracked. An observed spatial point 7, situated on the edge line 3a, is automatically selected along said line by an algorithm for the edge-determination functionality. This point 7 must be arranged in the direction, selected by the user, along the edge line 3a to be tracked, i.e. to the left of corner 1a and the crosshairs as alignment-display functionality 2 in this example of the symbolized display depiction. The functionality according to the invention is used to check whether the point 7 is arranged in the vicinity of a corner 1b, which is detected in the detector image (in this respect, see also the subsequent description in relation to FIG. 5b). In this case, the sighting unit 13 is automatically aligned on the corner 1b and the automatic edge-tracking functionality is halted. Otherwise, particularly in the case of a deviation of the alignment of the sighting unit 13 from the profile of the edge line 3a to be tracked in accordance with the display of the alignment-display functionality 2, correction data are calculated on the basis of measurement data for the current alignment of the sighting unit 13 and calibration data of the structure measuring unit 10 according to the invention, in particular for the measurement data of the imaging detector, and the alignment of the sighting unit 13 is tracked accordingly.

FIG. 5b depicts the determination of a corner 1b, at which edge lines 3a, 3d, 3e intersect. Within the scope of a control loop of the edge-tracking and projection functionality, a check is made as to whether a point 7 as intermediate point lies close to a corner 1b detected in the detector image. An edge determination by means of image processing is carried out within a pixel region 8 around the point 7, wherein the size of the pixel region 8 for determining the edge can preferably be defined by the user. Smaller dimensioning of the pixel region 8 can significantly reduce the computational time and hence the time expenditure for the measurement process. Here, in particular, an optimized adaptation of the size of a pixel region 8 to be analyzed to the incline of the edge 3a to be tracked may be expedient in the corresponding image display.

In a preferred embodiment, the sighting unit 13 need not necessarily already be aligned precisely on the corner 1a at first for carrying out the functionality (see FIG. 3a). It is also possible for the sighting unit 13 to be aligned only coarsely to the corner for the sighting unit 13 to be aligned only coarsely to the corner, but for the corner to be situated in the field of view of the imaging detector. Image processing is used to extract the position of the corner from a recorded image, for example as intersection of several intersecting edges, the angle offset is calculated from this position and, on the basis thereof, the sighting unit 13 is aligned to the corner 1a.

Figure 6A:
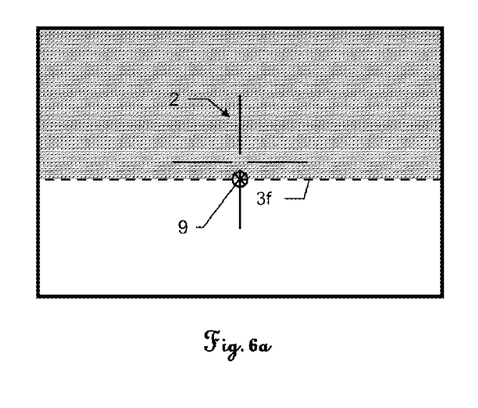
FIGS. 6a and 6b show an example of starting the procedures described herein with only an adge in the image filed of a camera.
Figure 6B:
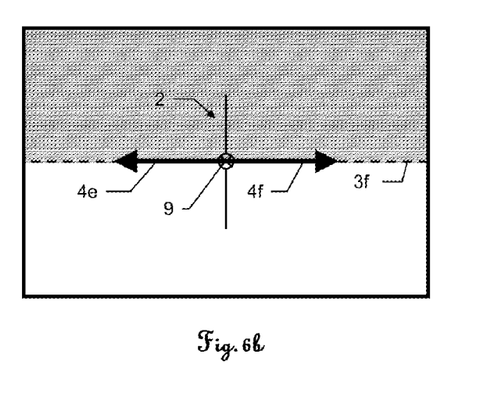

As depicted in FIGS. 6a and 6b, it also suffices in a preferred embodiment for only an edge 3f to be situated in the image field of the camera instead of a corner for the purposes of starting the procedure. In this case, the measuring unit 13 is aligned to the point 9 lying on this edge 3f which is closest to the current alignment. In a further step, depicted in FIG. 6b, the user is subsequently provided with the option of tracking the edge 3f in a desired direction up to the next corner by selecting one of the directional arrows 4e and 4f, for example by touching one of the directional arrows 4e and 4f on a touchscreen. Alternatively, there can also be automatic tracking of the edge 3f in one of the two directions.

It is understood that these depicted figures only represent possible exemplary embodiments in a schematic manner. The various approaches can just as easily be combined with one another as well as with methods and units from the prior art.

The invention described above is suitable for significantly accelerating the process of measuring significant spatial points in a structure, in particular edges and corners within a room, combined with increased operating convenience for a user.

What is claimed is:

1. A measuring unit for measuring spatial points along edges and/or corners between adjacent surfaces of a structure within the scope of building and/or extending buildings, comprising:
   a top part, mounted on a base such that it is rotatable about a rotational axis;

a sighting unit which is mounted on the top part such that it is pivotable about a pivot axis and equipped with a laser source designed to emit a laser beam, an imaging detector and an alignment-display functionality for specifying an alignment of the sighting unit on a spatial point as sighting point;

an evaluation and control unit;

a first and a second rotational drive that render it possible to drive and align the top part or the sighting unit;

a spatial alignment of the sighting unit in relation to the base being detectable by two goniometers, wherein:

the evaluation and control unit is connected to the laser source, a distance-determination detector and the goniometers in order to associate a detected distance with a corresponding alignment and hence determine coordinates for spatial points, and it is also connected to the imaging detector; and the measuring unit for measuring edges and/or corners between adjacent surfaces of any form of the structure has an edge-tracking functionality, which runs at least partly automatically after triggering, wherein within the scope of the edge-tracking functionality, after an at least coarse alignment of the sighting unit with the alignment-display functionality to a known or user-defined first corner or with a first edge point between adjacent surfaces of the structure and recording an image of this first corner or this first edge point with the surroundings thereof, edge lines are identified by determining edges by image processing;

there is a query relating to which of the identified edge lines should be continued to be tracked from the first corner or in which direction the identified edge line should be continued to be tracked from the first edge point; and after obtaining a corresponding user input, the user-defined edge line is automatically tracked by actuating the sighting unit, at least until a further corner, wherein tracking the user-defined edge line within the scope of the edge-tracking functionality comprises actuating the sighting unit by means of the first and the second rotational drive to change the spatial alignment of the sighting unit in such a way that the sighting unit follows a direction of the user-defined edge line according to the corresponding user input.

2. The measuring unit as claimed in claim 1, wherein spatial points situated along the user-defined edge line are measured.

3. The measuring unit as claimed in claim 1, wherein:

the edge-tracking functionality is designed to display to the user on a display of the evaluation and control unit suggestions for tracking edge lines by means of identified edge lines and/or by symbols; and after selecting and confirming a suggestion represented by means of an identified edge line and/or by a symbol, a selected edge line is automatically tracked by the sighting unit, at least until a further corner.

4. The measuring unit as claimed in claim 3, wherein spatial points situated along the user-defined edge line are measured.

5. The measuring unit as claimed in claim 1, wherein the edge-tracking functionality is designed such that, within the scope of tracking a selected edge line by an appropriate change in the alignment of the sighting unit in the horizontal and/or elevation direction, there is continuous and/or periodic recording of images and determining of an edge line belonging to an edge by means of edge extraction using digital image processing, wherein a deviation of the alignment-display functionality from the edge line belonging to the selected edge is determined in the image, from which a corresponding correction of the alignment of the sighting unit is determined and, on the basis of this, the sighting unit is aligned to the selected edge line.

6. The measuring unit as claimed in claim 1, wherein, after tracking an edge line from the first corner to a first further corner:

the edge-tracking functionality is halted;

the first further corner is measured in a user-defined manner; and/or the edge-tracking functionality is continued to a further corner.

7. The measuring unit as claimed in claim 1, wherein suggestions for tracking edge lines are displayed to the user on a display of the evaluation and control unit:

by means of symbols, wherein an edge line to be tracked is selected or a suggestion is confirmed by clicking on or touching the associated symbol on a touchscreen; and/or by means of alphanumeric characters, wherein an edge line to be tracked is selected or a suggestion is confirmed by entering a corresponding alphanumeric character on a keyboard of the evaluation and control unit.

8. The measuring unit as claimed in any claim 1, wherein an edge line to be tracked is selected by marking a line on a display of the evaluation and control unit, in particular by means of a pen on a touchscreen.

9. The measuring unit as claimed in claim 1, wherein the edge-tracking functionality is equipped for providing an option for automated tracking and measuring of edge lines along a continuous path between a plurality of neighboring corners and the edge lines enclose a common surface of the structure.

10. The measuring unit as claimed in claim 1, wherein the edge-tracking functionality is designed for tracking edge lines, which:

are arranged at right angles to one another;

are arranged at an angle to one another which deviates from 90°; and/or are curved.

11. A method for measuring spatial points along edges and/or corners between adjacent surfaces of a structure within the scope of building and/or extending buildings, using a measuring unit comprising:

a top part, mounted on a base such that it is rotatable about a rotational axis;

a sighting unit which is mounted on the top part such that it is pivotable about a pivot axis, provides distance-measuring functionality in the form of a distance-determination detector, and is equipped with a laser source designed to emit a laser beam an imaging detector and an alignment-display functionality for specifying an alignment of the sighting unit on a spatial point as sighting point; and an evaluation and control unit;

a first and a second rotational drive render it possible to drive and align the top part or the sighting unit;

a spatial alignment of the sighting unit in relation to the base being detectable by two goniometers;

the evaluation and control unit is connected to the laser source, the distance-determination detector and the goniometers in order to associate a detected distance with a corresponding alignment and hence determine coordinates for spatial points, and it is also connected to the imaging detector, the method further including:

at least coarse alignment of the sighting unit with the alignment-display functionality to a known or user-defined first corner or first edge point between adjacent surfaces of the structure; and an edge-tracking functionality, comprising:

recording an image of this first corner or first edge point with its surroundings, identifying edge lines by determining edges by image processing;

querying a user decision as to which of the identified edge lines or in which direction the edge line should be continued to be tracked; and tracking the user-defined edge line by actuating the sighting unit, at least until a further corner, wherein tracking the user-defined edge line within the scope of the edge-tracking functionality comprises actuating the sighting unit by means of the first and the second rotational drive to change the spatial alignment of the sighting unit in such a way that the sighting unit follows a direction of the user-defined edge line according to the corresponding user input.

12. The method as claimed in claim 11, wherein:

suggestions for tracking edge lines are made to the user within the scope of querying a user decision by symbols displayed on a display of the evaluation and control unit; and after selecting and confirming a suggestion represented by a symbol, a selected edge line is automatically tracked by the sighting unit, at least until a further corner.

13. The method as claimed in claim 11, further comprising measuring spatial points situated along the user-defined edge line.

14. The method as claimed in claim 11, wherein within the scope of tracking a selected edge line by an appropriate change in the alignment of the sighting unit in the horizontal and/or elevation direction, there is continuous and/or periodic recording of images and determining of an edge line belonging to an edge by means of edge extraction using digital image processing, wherein a deviation of the alignment-display functionality from the edge line belonging to the selected edge is determined in the image, from which a corresponding correction of the alignment of the sighting unit is determined and, on the basis of this, the sighting unit is aligned to the selected edge line.

15. The method as claimed in claim 11, wherein after tracking an edge line from the first corner to a first further corner, the edge-tracking functionality is halted, the first further corner is measured in a user-defined manner, and/or the edge-tracking functionality is continued to a further corner.

16. The method as claimed in claim 11, wherein suggestions for tracking edge lines are displayed to the user on a display of the evaluation and control unit:

by means of symbols, wherein an edge line to be tracked is selected or a suggestion is confirmed by clicking on or touching the associated symbol on a touchscreen; and/or by means of alphanumeric characters, wherein an edge line to be tracked is selected or a suggestion is confirmed by entering a corresponding alphanumeric character on a keyboard of the evaluation and control unit.

17. The method as claimed in claim 11, wherein:

an edge line to be tracked is selected by marking a line on a display of the evaluation and control unit; and/or the edge-tracking functionality is equipped for providing an option for automatic tracking and measuring of edge lines along a continuous path between a plurality of neighboring corners, wherein the edge lines enclose a common surface of the structure.

18. The method as claimed in claim 11, wherein an edge line to be tracked is selected by marking a line on a display of the evaluation and control unit by means of a pen on a touchscreen.

19. A tangible non-transitory computer program product with program code, which is stored on a tangible non-transitory machine-readable storage medium, for carrying out the method as claimed in claim 11.

* * * * *